United States Patent
Blackmore (10) Patent No.: US 10,240,958 B2
(45) Date of Patent: Mar. 26, 2019

(54) MEASURING TUBE UNIT AND CORIOLIS MASS FLOWMETER

(71) Applicant: Krohne AG, Basel (CH)

(72) Inventor: James Blackmore, Wollaston (GB)

(73) Assignee: KROHNE AG, Basel (CH)

( * ) Notice: Subject to any disclaimer, the term of this patent is extended or adjusted under 35 U.S.C. 154(b) by 0 days.

(21) Appl. No.: 15/723,288

(22) Filed: Oct. 3, 2017

(65) Prior Publication Data

US 2018/0094957 A1    Apr. 5, 2018

(30) Foreign Application Priority Data

Oct. 3, 2016   (DE) .......................... 10 2016 118 695

(51) Int. Cl.
*G01F 1/84*   (2006.01)

(52) U.S. Cl.
CPC .......... *G01F 1/8413* (2013.01); *G01F 1/8404* (2013.01); *G01F 1/8495* (2013.01)

(58) Field of Classification Search
CPC ....................................................... G01F 1/84
See application file for complete search history.

(56) References Cited

U.S. PATENT DOCUMENTS

| | | | |
|---|---|---|---|
| 5,540,106 A | 7/1996 | Lew et al. | |
| 6,904,667 B2 | 6/2005 | Lanham et al. | |
| 7,946,187 B2 | 5/2011 | Hussain et al. | |
| 7,971,494 B2 | 7/2011 | Hussain et al. | |
| 8,601,884 B2 | 12/2013 | Hussain et al. | |
| 8,695,436 B2* | 4/2014 | Bitto | G01F 1/84 73/861.355 |
| 8,826,744 B2* | 9/2014 | Rieder | G01F 1/8404 73/861.355 |
| 9,506,793 B2 | 11/2016 | Sukemura et al. | |
| 2012/0255371 A1* | 10/2012 | Rieder | G01F 1/8404 73/861.357 |
| 2013/0291652 A1* | 11/2013 | Rieder | G01F 1/8404 73/861.357 |
| 2017/0261474 A1* | 9/2017 | Zhu | G01F 1/8413 |
| 2018/0087946 A1* | 3/2018 | Rolph | G01F 1/8413 |

FOREIGN PATENT DOCUMENTS

WO   2016/096243 A1   6/2016

* cited by examiner

*Primary Examiner* — Jewel V Dowtin
(74) *Attorney, Agent, or Firm* — David S. Safran; Roberts Mlotkowski Safran Cole & Calderon, P.C.

(57) ABSTRACT

A Coriolis mass flowmeter and a measuring tube unit for use in the Coriolis mass flowmeter with an inlet end and an outlet end, at least two measuring tubes and at least two transition pieces. In each case, one transition piece is arranged on a measuring tube at the inlet end. Each measuring tube has a measuring tube cross section and each transition piece has a transition piece cross section at the inlet. The transition piece is designed in one piece with the associated measuring tube, and the transition piece cross section deviates in its shape and size from the associated measuring tube cross section, the measuring tubes being arranged and aligned in such a manner that the transition piece cross sections form an overall cross section and thus a flow divider.

15 Claims, 7 Drawing Sheets

MEASURING TUBE UNIT AND CORIOLIS MASS FLOWMETER

BACKGROUND OF THE INVENTION

Field of the Invention

The invention is based on a measuring tube unit for use in a Coriolis mass flowmeter with an inlet end and an outlet end, comprising at least two measuring tubes and at least two transition pieces, wherein, in each case, one transition piece is arranged on a measuring tube at the inlet end, wherein each measuring tube has a measuring tube cross section and each transition piece has a transition piece cross section at the inlet.

Description of Related Art

Furthermore, the invention is based on a Coriolis mass flowmeter with at least one measuring tube unit with an inlet end and an outlet end, wherein the measuring tube unit has at least two measuring tubes and at least two transition pieces, wherein, in each case, a transition piece is arrange/d on a measuring tube at the inlet end of the measuring tube unit, wherein each measuring tube has a measuring tube cross section and each transition piece has a transition piece cross section at the inlet.

Coriolis mass flowmeters are suitable for the determination of the mass flow of gases and/or liquids in particularly diverse fields of application. Thereby, that the Coriolis force acts on the fluid to be measured when it flows through an oscillating tube is utilized for determining the mass flow. Accordingly, Coriolis mass flowmeters generally have at least one measuring tube through which a fluid flows, an oscillation generator that excites the measuring tube to oscillation, as well as two oscillation sensors, wherein the oscillation sensors are arranged at the inlet end and at the outlet end of the measuring tube. If the measuring tube is excited to oscillation during operation by the oscillation generator, the oscillation of the measuring tube is detected by the oscillation sensors on the inlet side and on the outlet side. If the measuring tube now additionally has a fluid flowing through it, the Coriolis force causes an additional force on the measuring tube. This can be measured as a phase difference between the inlet side and the outlet side oscillation. The phase difference is proportional to the mass flow of the fluid.

If, in the context of the present invention, inlet end or inlet side, or respectively, outlet end or outlet side is mentioned, the reference point is always the direction of flow of the fluid to be detected during operation of the flowmeter. Accordingly, the inlet end corresponds to the side of the measuring tube unit through which the fluid flows into the measuring tube unit, and the outlet end corresponds accordingly to the side through which the fluid leaves the measuring tube unit.

Various configurations of Coriolis mass flowmeters that differ, in particular, in the number and design of the measuring tubes are known from the prior art. A particularly simple design has only one, single, straight measuring tube. A further design has a double tube arrangement, in which the measuring tubes are excited to oscillation in opposite directions. As an alternative to the use of straight measuring tubes, pipe bends, for example in the form of U-shaped tubes, are used, wherein designs with a single pipe bend as well as with a double tube arrangement are also known.

For use in practice, Coriolis mass flowmeters are installed in existing piping systems and connected to the pipelines via a flange connection. If the Coriolis mass flowmeter has more than one measuring tube, for example two or four measuring tubes, the fluid flow to be measured has to be divided preferably evenly via a flow divider into the individual measuring tubes.

It is known from the prior art to provide, for example, a holder for the housing of the flowmeter, which is arranged at least at the inlet-side end and preferably also at the outlet-side end of the measuring tubes and is simultaneously configured as a flow divider. For this, the holder has a connecting region to a pipeline. This connecting region has openings, wherein each opening is connected to a measuring tube, for example by a welded connection.

A disadvantage of this embodiment is that each holder is suitable for exactly one measurement configuration, i.e., a certain number of measuring tubes. Different measurement configurations, thus, require a large number of different holders. However, since the design of a corresponding holder is very complex, the effort to manufacture and maintain this plurality of holders is particularly high.

Furthermore, the illustrated design of the prior art disclosed above has the disadvantage that, within the flowmeter, the fluid to be measured is in contact with at least two materials, namely the material of the holder and the material of the measuring tubes.

The European Patent Application EP 2 650 656 A1 and corresponding U.S. Pat. Nos. 7,971,494 B2 and 8,601,884 B2 disclose a Coriolis mass flowmeter that has an additional transition piece and a connecting piece for the connection of the two measuring tubes to a pipeline, wherein the transition piece and the connecting piece are produced from one workpiece. A mass flowmeter having a corresponding transition and connection piece also has the disadvantages described above.

SUMMARY OF THE INVENTION

Based on the previously described prior art, it is thus the object of the invention to provide a measuring tube unit and a Coriolis mass flowmeter that avoid the disadvantages of the prior art.

According to a first teaching of the present invention, the object is achieved by the measuring tube unit mentioned in the introduction in that the transition piece is configured in one piece with the associated measuring tube, and that the transition piece cross section deviates in its shape and size from the associated measuring tube cross section, wherein the measuring tube is designed and aligned in such a manner that the transition piece cross sections form an overall cross section and, thus, a flow divider.

According to the invention, it has been recognized that the connection of a plurality of measuring tubes to a single pipeline can be simplified in that each measuring tube is designed in one piece with a transition piece, wherein the entirety of the transition pieces makes the connection of a plurality of measuring tubes to a pipeline possible. Each transition piece is configured in such a manner and, during operation, is arranged in such a manner that it guides a part of the fluid flow from the one pipe into the associated measuring tube. In one design, the transition piece is a kind of inlet funnel into the associated measuring tube.

Furthermore, the transition piece is designed in such a manner that the transition piece cross section deviates in its shape and in its size from the measuring tube cross section. Advantageously, the transition piece is adapted in its design, on the one hand, to the cross section of the one pipeline and simultaneously to the measurement configuration, in detail to the number of measuring tubes.

In addition, the measuring tubes according to the invention are arranged and aligned in such a manner that the transition piece cross sections of the measuring tubes form an overall cross section and, thus, a flow divider. This overall cross section can lie in a plane, but alternatively, the individual transition piece cross sections can also form an angle which is less or greater than 180° with respect to one another. Overall, a flow divider is formed by the formation of the overall cross section, whereby an additional component for dividing the fluid flow to be measured can advantageously be dispensed of.

The provision of a measuring tube unit according to the invention makes it possible to dispense of the manufacture of a plurality of different holders, as described in the introduction, since the transition from a pipeline to the at least two measuring tubes is provided by the measuring tube unit itself. In addition, the measuring tube unit according to the invention has the advantage that the fluid to be measured has contact with only one material in the flowmeter during operation.

According to a first design of the measuring tube unit according to the invention, the overall cross section has a circular design. Particularly preferably, the diameter of the overall cross section essentially corresponds to the diameter of the one pipeline to be connected. In respect to the flow of the fluid in the transition region between the one pipeline and the transition pieces, a circular configuration of the overall cross section, wherein the diameter of the overall cross section substantially corresponds to the diameter of the one pipeline, is particularly favorable. It is likewise advantageous when the shape of the overall cross section slightly deviates from a circular shape. It is, for example, conceivable for the overall cross section to have the form of a shamrock or a square or to form a combination of circular segments.

Furthermore, it is advantageous when the transition piece cross sections have the same shape and the same size. According to this design, it is ensured that the fluid flow during operation is evenly distributed over the individual measuring tubes.

According to a further advantageous design, the transition piece cross section of at least one transition piece has the shape of a semicircle or a quarter circle or a circular segment. The shape of the transition piece cross section is, in particular, dependent on the number of measuring tubes. If the measuring tube unit has two measuring tubes, each with a transition piece, the transition piece cross section of each transition piece is preferably semi-circular. If the measuring tube unit has four measuring tubes, each with a transition piece, the transition piece cross section of each transition piece is preferably a quarter circle. In addition, it is also advantageous when the transition piece cross sections have the shape of a circular segment or a circular sector or a triangle.

It is particularly preferred when the surface of the transition piece cross section is greater than the surface of the associated measuring tube cross section and when the transition piece has a diameter decrease as seen in the flow direction. This design of the measuring tube unit is used, for example, when the cross section surface of the one pipeline is greater than the measuring tube cross section. This is particularly the case when the measuring tube unit has at least two measuring tubes or at least four measuring tubes.

In addition, it is also advantageous when the surface of the transition piece cross section is less than the surface of the associated measuring tube cross section and when the transition piece has a diameter increase in the direction of flow. This design is used, in particular, when the cross section surface of the one pipeline is less than the cross section of the measuring tube.

A further design of the measuring tube unit has at least two further transition pieces, wherein, in each case, one transition piece is arranged on a measuring tube at the outlet end, wherein each transition piece has a transition piece cross section at the outlet, wherein the transition piece is configured in one piece with the associated measuring tube and wherein the transition piece cross section deviates in its shape and/or in its size from the associated measuring tube cross section, wherein the measuring tubes are arranged in such a manner that the transition piece cross sections form an overall cross section. This design has the advantage that, not only on the inlet side but also on the outlet side, a transition from at least two measuring tubes to a pipeline can be ensured, which is advantageous in terms of flow.

In respect to the configuration of the outlet-side transition piece, in particular of the transition piece cross section, reference is made to the features of the transition pieces arranged on the inlet side. All the designs described in the following also relate both to the transition pieces arranged on the inlet side as well as on the outlet side.

Particularly preferably, the outlet-side transition pieces are identical to the transition pieces arranged at the inlet end. Alternatively, they can also deviate, in particular in the form of the transition piece cross section, from the transition pieces arranged on the inlet side.

According to a further preferred embodiment, the transition piece and the associated measuring tube are produced from one workpiece. Particularly preferably, the transition piece is a deformation of the end geometry of the measuring tube, wherein the wall thickness of the measuring tube preferably is retained. In this respect, the transition piece and the associated measuring tube are preferably made from one tube.

The transition piece or the unit made of the transition piece and the measuring tube is produced, for example, by a mechanical forming process. This has the advantage that the transition piece or the unit of transition piece and measuring tube has particularly smooth transitions.

Alternatively, the transition piece or the unit made of transition piece and measuring tube can be produced by means of high-pressure forming, in particular by means of internal high-pressure forming. This has the advantage that, due to the particularly high precision of the method, the transition piece or the unit made of transition piece and measuring tube also has a particularly high precision with respect to its shape and its dimension.

Alternatively, the transition piece or the unit made of the transition piece and the measuring tube can also be produced by means of laser sintering or by means of a 3-D printing process. The advantage of these methods is that arbitrary geometries can be created so that the geometry of the transition piece can be arbitrarily complex. In addition, the transition piece or the unit of transition piece and measuring tube also has a particularly high precision with regard to its shape and its dimension.

According to a further design of the measuring tube unit according to the invention, the transition pieces adjoin one another at their ends in common contact contours and are tightly connected to one another in the contact contours. According to this design, it is ensured that, during operation, the fluid to be measured cannot leak past the transition pieces into the flowmeter.

Preferably, the transition pieces are connected to one another in the form of a positive-locking, non-positive and/or material-locking connection in the region of the contact contours.

According to a second teaching of the present invention, the object stated at the outset is achieved by the Coriolis mass flowmeter mentioned at the outset in that the transition piece is designed in one piece with the associated measuring tube and in that the transition piece cross section deviates in its shape and size from the associated measuring tube cross section, wherein the measuring tubes are arranged and aligned in such a manner that the transition piece cross sections form an overall cross section and thus a flow divider.

According to a preferred design of the Coriolis mass flowmeter, the measuring device has one of the measuring tube units described above. The explanations given in view of the respective measuring tube unit also apply to a Coriolis mass flowmeter having such a measuring tube unit.

According to a further design, at least one holder is provided with a receptacle for the measuring tube unit, wherein the receptacle is tightly connected with the measuring tube unit.

In detail, there is a plurality of possibilities for designing and further developing the measuring tube unit according to the invention and the Coriolis mass flowmeter as will be apparent from the following description of preferred embodiments in conjunction with the accompanying drawings.

DETAILED DESCRIPTION OF THE INVENTION

Figure 1:
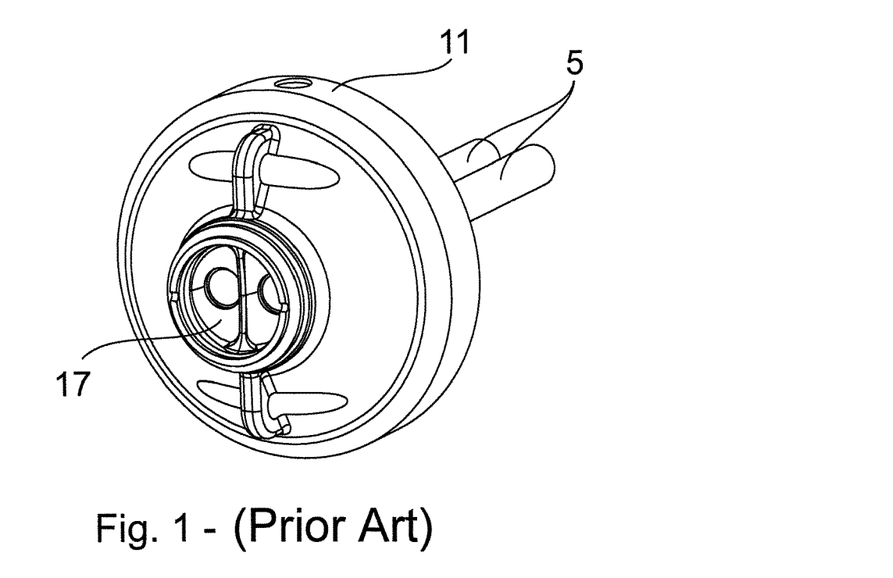
FIG. 1 an arrangement from the prior art,
FIG. 2 a sectional view of the arrangement from the prior art.

FIG. 1 shows an arrangement of two measuring tubes 5 and a holder 11 for receiving the housing (not shown) of a Coriolis mass flowmeter from the prior art. The arrangement is suitable for connecting two measuring tubes 5 to a pipeline. For this, the holder 11 has a connecting region 17, wherein the connecting region 17, as a flow divider, divides the fluid flow evenly into the measuring tubes 5 during operation. A disadvantage of the illustrated arrangement is that the holder 11, which likewise serves as a connection to the pipeline and as a flow divider, is adapted to one measurement configuration, here consisting of two measuring tubes 5. Different measurement configurations, thus, require different holders 11, the manufacture of which, however, is relatively expensive because of their complexity.

Figure 2:
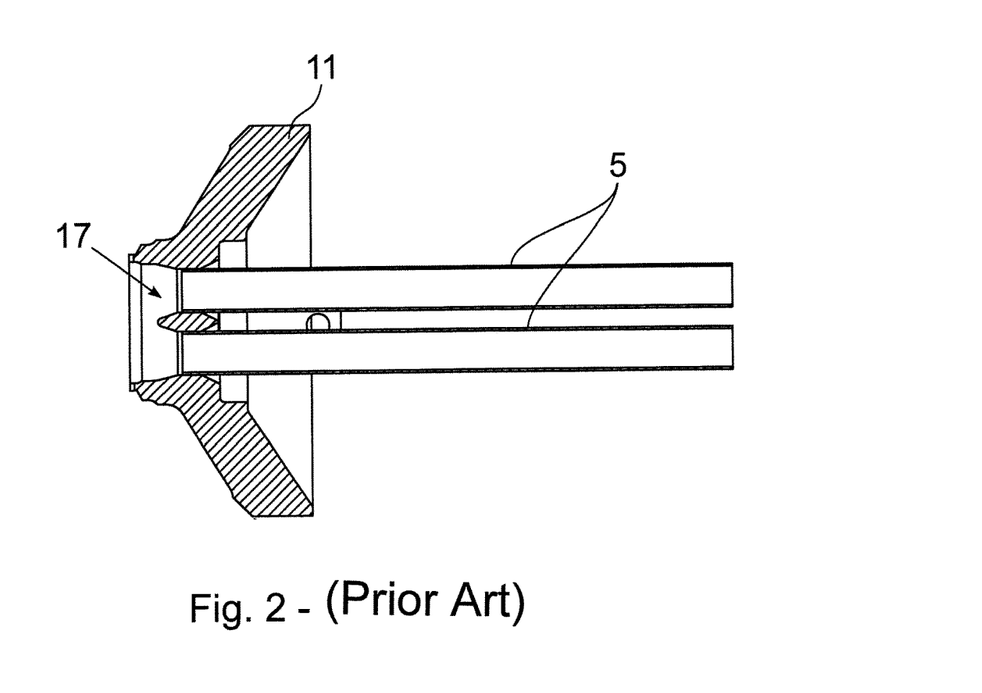

FIG. 2 also shows an arrangement for connecting two measuring tubes 5 to a pipeline via a holder 11 from the prior art in a sectional view. The connecting region 17 is designed in such a manner that, as a flow divider, it divides the fluid flow flowing through the pipeline (not shown here) into the measuring tubes 5. The measuring tubes 5 are connected to the connecting region 17 by means of a welded connection.

Figure 3:
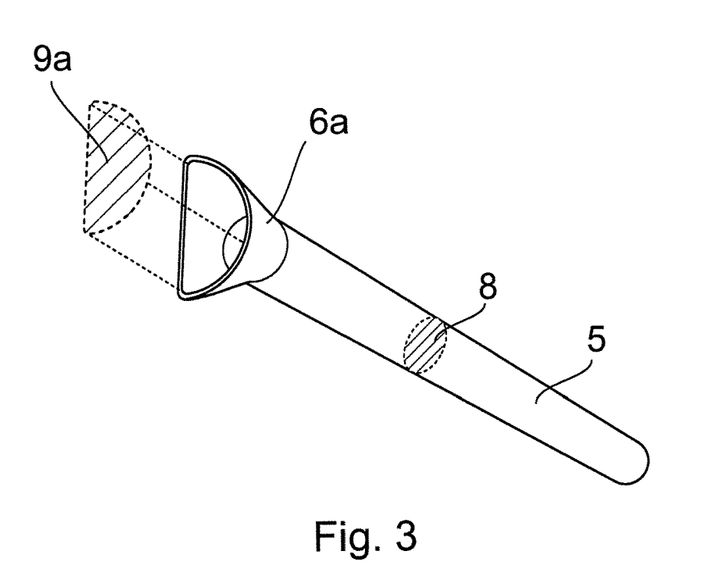
FIG. 3 is perspective view of a measuring tube with a transition piece of a measuring tube unit according to the invention.
Figure 4:
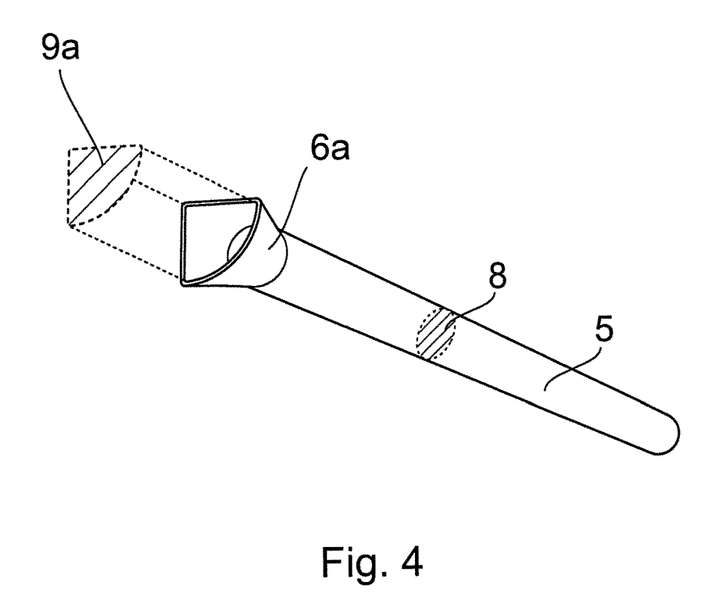
FIG. 4 is perspective view of another measuring tube with a transition piece of a measuring tube unit according to the invention.

FIGS. 3 and 4 each show embodiments of a measuring tube 5 and of a transition piece 6a, wherein the transition piece 6a is, in each case, designed in one piece with the measuring tube 5. The measuring tube 5 has a circular measuring tube cross section 8 and the transition piece 6a has a transition piece cross section 9a at the inlet.

The transition piece cross section 9a shown in FIG. 3 has a semi-circular design, in the course of the transition piece 6a it has a transition to the circular measuring tube cross section 8 of the measuring tube 5. The measuring tube 5 shown in FIG. 3 is, thus, suitable for use in a measuring tube unit 1 consisting of two measuring tubes 5.

The transition piece cross section 9a illustrated in FIG. 4 has the shape of a quarter circle and also has a transition to the circular measuring tube cross section 8 of the measuring tube 5 in the course of the transition piece 6a. The measuring tube 5 shown in FIG. 4 is, thus, suitable for use in a measuring tube unit 1 consisting of four measuring tubes 5.

Figure 5A:
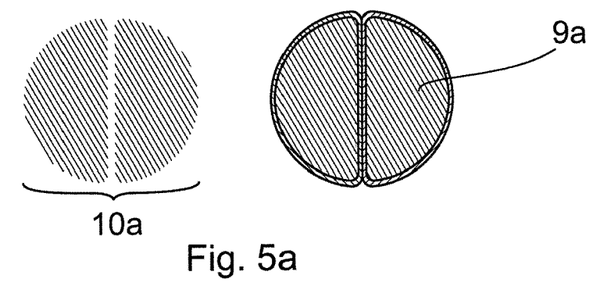
FIGS. 5a-5d are cross-sectional views of further embodiments of the overall cross section of the transition piece.
Figure 5B:
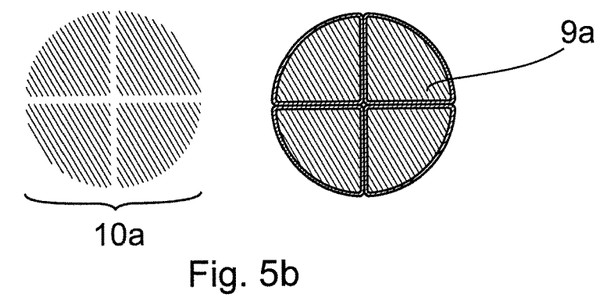
Figure 5C:
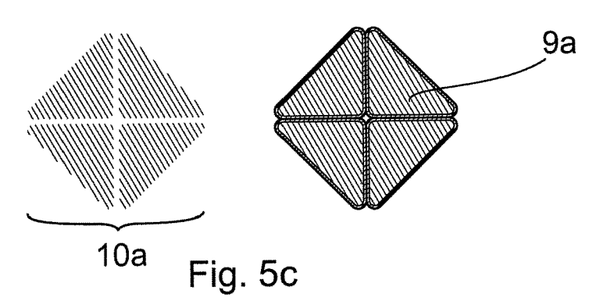
Figure 5D:
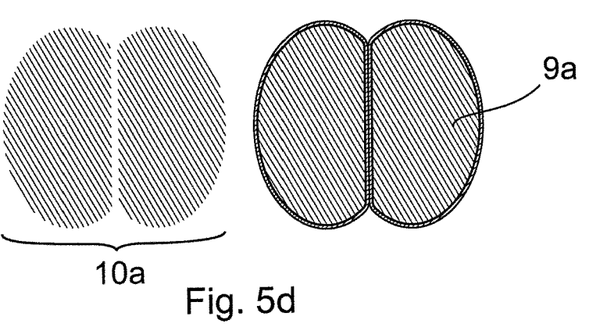

FIGS. 5a to 5d each show embodiments of transition piece cross sections 9a or overall cross sections 10a. In FIG. 5a, the transition piece cross sections 9a have a semi-circular design. Together, the transition piece cross sections 9a form a circular, overall cross section 10a. The transition cross sections 9a illustrated in FIG. 5b each have the form of a quarter circle, wherein the overall cross section 10a is also circular. The transition piece cross sections 9a illustrated in FIG. 5c are triangular in shape and together form an overall cross section 10a in the form of a square. The transition piece cross sections 9a illustrated in FIG. 5d have the shape of a circular segment, wherein the overall cross section 10a deviates slightly from a circular shape.

Figure 6:
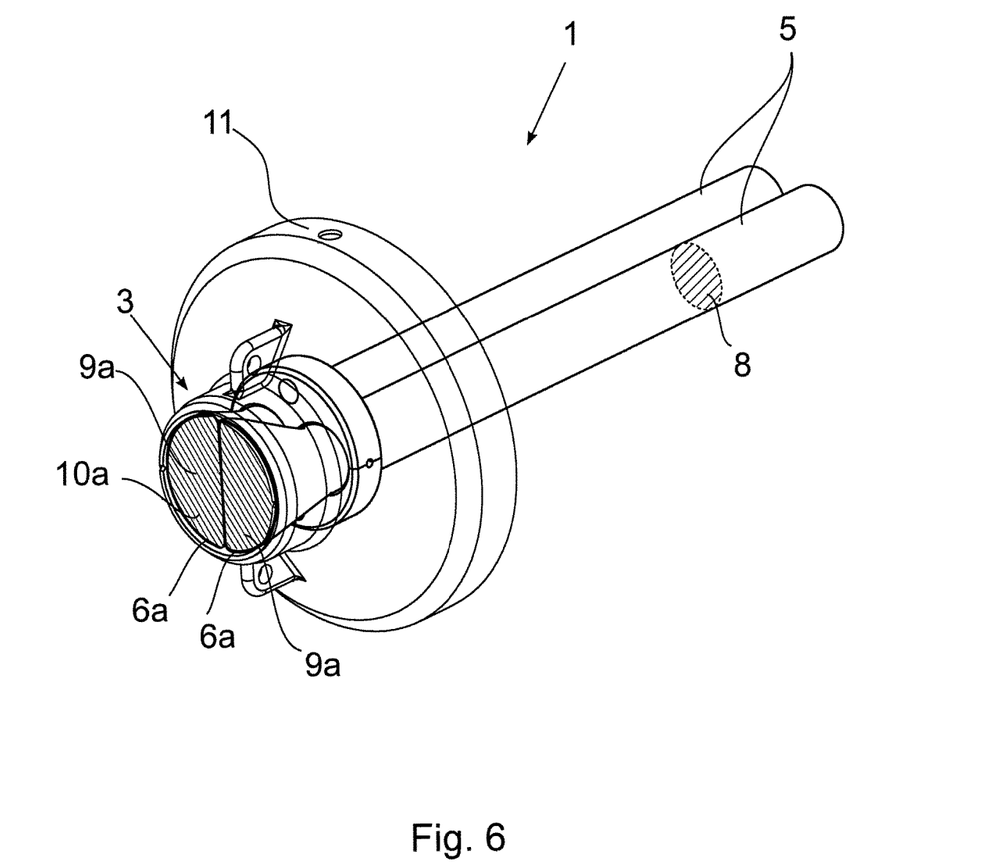
FIG. 6 is a perspective view of a first embodiment of a measuring tube unit according to the invention.

FIG. 6 shows a first embodiment of a measuring tube unit 1 according to the invention for use in a Coriolis mass flowmeter 2 with an inlet end 3 and an outlet end 4 (not shown here) with two measuring tubes 5 and two transition pieces 6a, wherein each measuring tube has a measuring tube cross section 8 and each transition piece 6a has a transition piece cross section 9a at the inlet. The transition pieces 6a are thereby designed in one piece with the respective measuring tube 5, in the illustrated embodiment they are produced from one workpiece. The measuring tubes 5 are arranged in such a manner that the transition piece cross sections 9a have a circular overall cross section 10a, which is identical to the pipeline cross section of the pipe to be connected. In the connected state, the two transition pieces 6a serve, on the one hand, to connect the two measuring tubes 5 to a pipeline and, at the same time, to divide the fluid flow flowing through the pipeline into the measuring tubes 5 during operation. The use of a measuring tube unit 1, thus, has the advantage that the holder 11 does not have to meet any special requirements with respect to the measurement configuration. In this respect, the holder 11, which is complicated to manufacture, can be used particularly flexibly.

Figure 7:
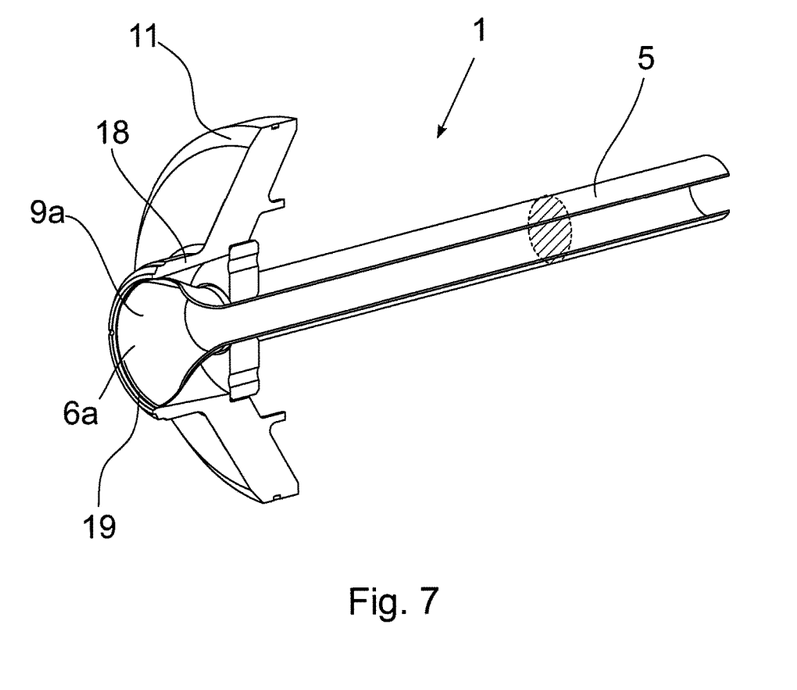
FIG. 7 is a sectional view of the first embodiment of the measuring tube unit according to the invention.

FIG. 7 shows a sectional view of the first embodiment of the measuring tube unit 1 according to the invention, wherein a measuring tube 5 and a transition piece 6a with a semi-circular transition piece cross section 9a are shown. A holder 11 with a receptacle 18 for the measuring tube unit 1 is also depicted, wherein the receptacle 18 connects tightly with the measuring tube unit 1, in detail with the transition pieces 6a, in the edge area 19.

Figure 8:
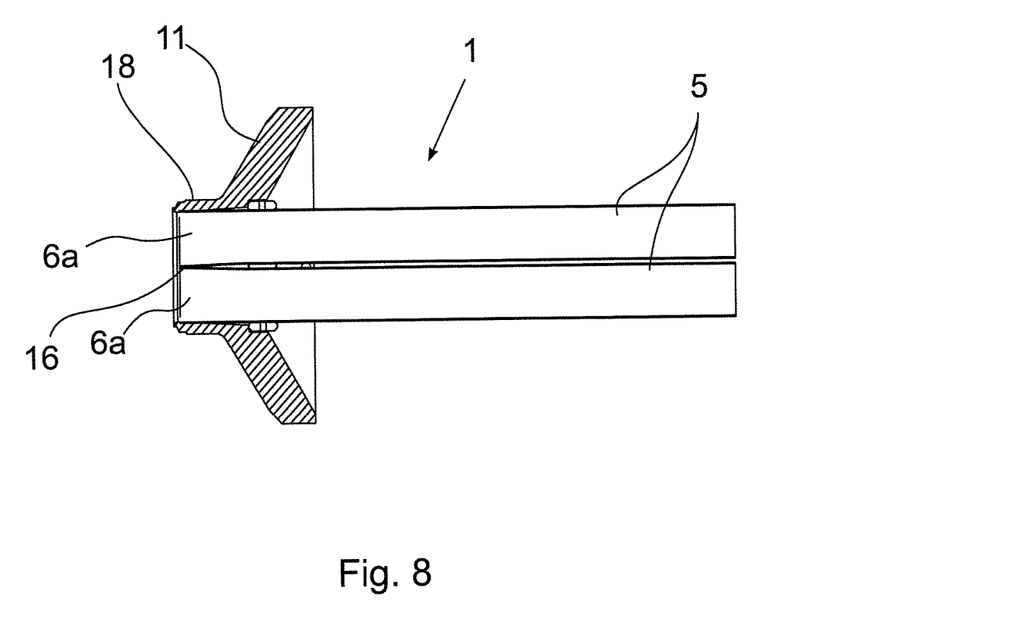
FIG. 8 is a second sectional view of the first embodiment of a measuring tube unit according to the invention.

FIG. 8 shows the first embodiment of a measuring tube unit 1 according to the invention in a sectional top view. The transition pieces 6a adjoin one another at their ends in contact contours 16 and are tightly connected to one another in the contact contours 16.

Figure 9:
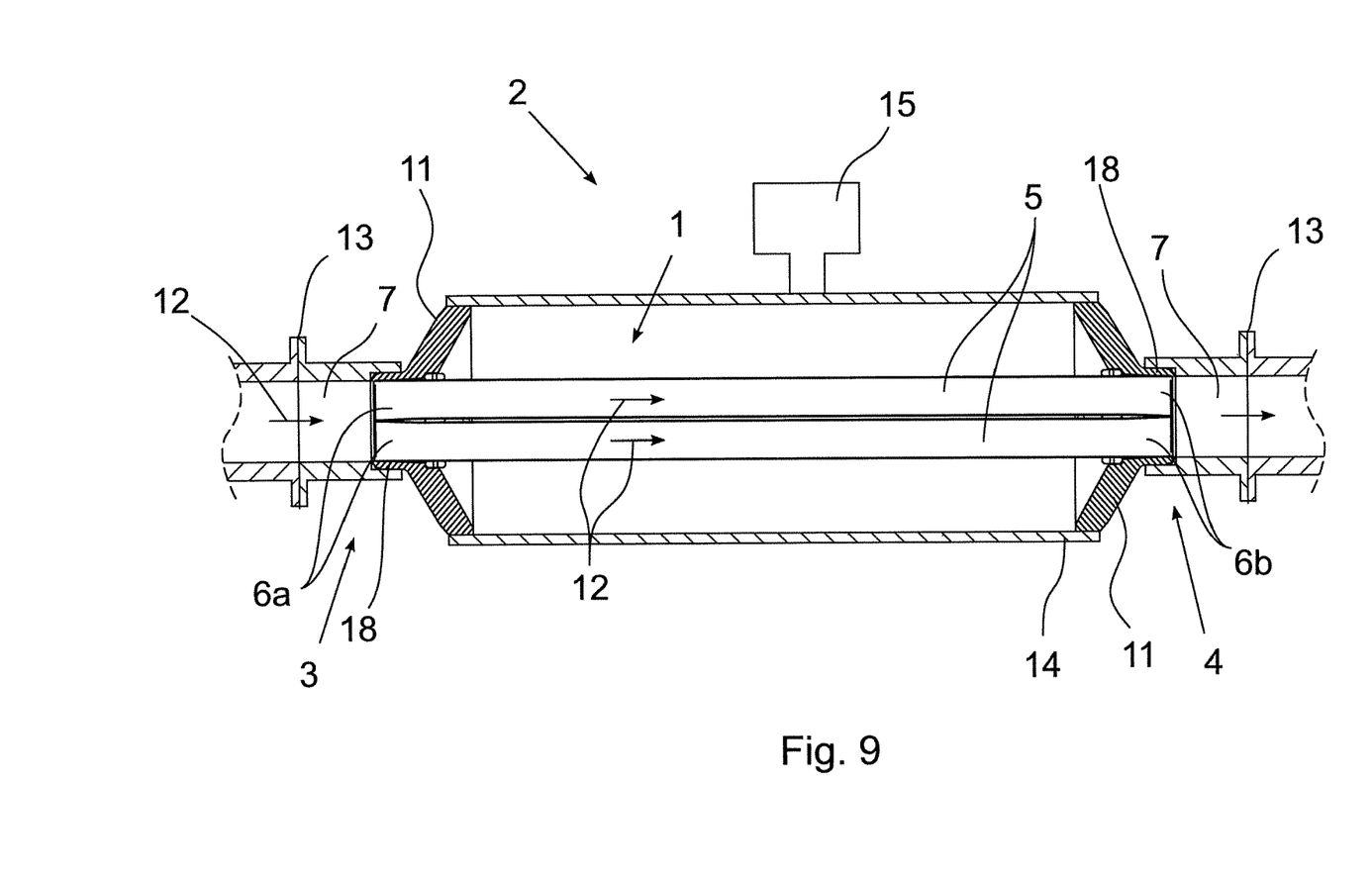
FIG. 9 is a cross-sectional view of an embodiment of a Coriolis mass flowmeter according to the invention.

FIG. 9 shows a first embodiment of a Coriolis mass flowmeter 2 according to the invention with a measuring tube unit 1 with an inlet end 3 and an outlet end 4, wherein the measuring tube unit 1 has two measuring tubes 5 and two transition pieces 6a, 6b each at the inlet end 3 and outlet end 4, which are each connected to a measuring tube 5 in one piece. The transition pieces 6a, 6b are used for connection to a pipeline 7, which has fluid flowing through it in the direction of the arrow 12 during operation. The flowmeter 2 is connected to the external pipeline via a flange connection 13. The housing 14 of the flowmeter 2 is also shown, in which the other components, such as, for example, oscillation generators and oscillation sensors, are also arranged. In addition, the Coriolis mass flowmeter 2 has a control and evaluation unit 15 for controlling the oscillation excitation and for evaluating and displaying the recorded measured data. In addition, the flow meter 2 has, on the inlet side as well as on the outlet side, a holder 11 for accommodating the housing 14, wherein the holder 11 also has a receptacle 18 for the measuring tube unit 1 and wherein the measuring tube unit 1 is arranged in the receptacle 18.

The illustrated embodiment of the Coriolis mass flowmeter according to the invention has the advantages according to the invention of a particularly simple and effective coupling of two measuring tubes 5 to a pipeline 7.

What is claimed is:

1. A measuring tube unit for use in a Coriolis mass flowmeter with an inlet end and an outlet end, comprising:
   at least two measuring tubes and at least two transition pieces, wherein each transition piece is arranged on a respective one of the measuring tubes at an inlet end thereof, and wherein each measuring tube has a measuring tube cross section and each transition piece has a transition piece cross section at the inlet end,
   wherein the transition piece is formed in one piece with the respective one of the measuring tubes, and
   wherein the transition piece cross section deviates in at least one shape and size from the cross section of the respective one of the measuring tubes, and
   wherein the measuring tubes are arranged and aligned in such a manner that the transition piece cross sections form an overall cross section and thus a flow divider.

2. Measuring tube unit according to claim 1, wherein the overall cross section has a circular shape.

3. Measuring tube unit according to claim 1, wherein all of the transition piece cross sections have the same shape and the same size.

4. Measuring tube unit according to claim 1, wherein the transition piece cross section of at least one transition piece has the form of a semicircle or a quarter circle or a circular segment.

5. Measuring tube unit according to claim 1, wherein a surface of the transition piece cross section is greater than a surface of the respective measuring tube cross section and wherein the transition piece has a diameter decrease in a direction of flow.

6. Measuring tube unit according to claim 1, wherein a surface of the transition piece cross section is less than a surface of the respective measuring tube cross section, and wherein the transition piece has a diameter increase in a direction of flow.

7. Measuring tube unit according to claim 1, wherein said at least two transition pieces comprises at least four transition pieces, wherein, one of the transition pieces is arranged on an outlet end of a respective one of the measuring tubes, wherein each transition piece has a transition piece cross section at the outlet end, wherein the transition piece is formed in one piece with the outlet end of the respective measuring tube, wherein the transition piece cross section deviates in its shape and/or size from the associated measuring tube cross section, wherein the measuring tubes are arranged in such a manner that the transition piece cross sections form an overall cross section.

8. Measuring tube unit according to claim 7, wherein the transition pieces at the outlet end are identical to the transition pieces arranged at the inlet end.

9. Measuring tube unit according to claim 1, wherein the transition piece and the respective measuring tube have been produced from the same workpiece.

10. Measuring tube unit according to claim 1, wherein each transition piece and measuring tube has been produced by one of a mechanical forming process, high-pressure forming, laser sintering and 3D printing process.

11. Measuring tube unit according to claim 1, wherein the transition pieces adjoin each other end-to-end in common contact contours and are tightly connected to one another at the contact contours.

12. Measuring tube unit according to claim 11, wherein the transition pieces are connected to one another in by at least one of a positive-locking and a material-locking connection in a region of the contact contours.

13. Coriolis mass flow meter, comprising:
   a control and evaluation unit for controlling oscillation excitation and for evaluating and displaying recorded measured data, and
   a measuring tube unit having at least two measuring tubes and at least two transition pieces, wherein each transition piece is arranged on a respective one of the measuring tubes at an inlet end thereof, and wherein each measuring tube has a measuring tube cross section and each transition piece has a transition piece cross section at the inlet end,
   wherein the transition piece is formed in one piece with the respective one of the measuring tubes, and
   wherein the transition piece cross section deviates in at least one of shape and size from the cross section of the respective one of the measuring tubes, and
   wherein the measuring tubes are arranged and aligned in such a manner that the transition piece cross sections form an overall cross section and thus a flow divider.

14. Coriolis mass flow meter according to claim 13, wherein said at least two transition pieces comprises at least four transition pieces, wherein, one of the transition pieces is arranged on an outlet end of a respective one of the measuring tubes, wherein each transition piece has a transition piece cross section at the outlet end, wherein the transition piece is formed in one piece with the outlet end of the respective measuring tube, wherein the transition piece cross section deviates in its shape and/or size from the associated measuring tube cross section, wherein the measuring tubes are arranged in such a manner that the transition piece cross sections form an overall cross section.

15. Coriolis mass flowmeter according to claim 13, wherein a holder with a receptacle for the measuring tube unit is provided, and wherein the receptacle is tightly connected to the measuring tube unit.

* * * * *